United States Patent [19]

Oosuga et al.

[11] Patent Number: 4,596,220
[45] Date of Patent: Jun. 24, 1986

[54] ELECTRONICALLY-CONTROLLED SYSTEM FOR SUPPLYING FUEL INTO CYLINDER

[75] Inventors: Minoru Oosuga, Hitachi; Yutaka Nishimura; Yoshishige Oyama, both of Katsuta, all of Japan

[73] Assignee: Hitachi, Ltd., Tokyo, Japan

[21] Appl. No.: 497,837

[22] Filed: May 25, 1983

[30] Foreign Application Priority Data

May 28, 1982 [JP] Japan ................... 57-89925

[51] Int. Cl.[4] .......................... F02D 43/00
[52] U.S. Cl. ................... 123/478; 123/480
[58] Field of Search ............ 123/478, 480, 486, 472, 123/491, 295, 297

[56] References Cited

U.S. PATENT DOCUMENTS

| | | | |
|---|---|---|---|
| 3,391,680 | 7/1968 | Benson | 123/297 |
| 3,989,013 | 11/1976 | Mitchell | 123/295 |
| 4,111,177 | 9/1978 | Regueiro | 123/295 |
| 4,155,332 | 5/1979 | Taegushi et al. | 123/478 |
| 4,181,100 | 1/1980 | Tamane et al. | 123/295 |
| 4,258,674 | 3/1981 | Wolff | 123/478 |
| 4,301,779 | 11/1981 | Hutton | 123/478 |
| 4,309,759 | 6/1982 | Tokuda et al. | 123/480 |
| 4,327,691 | 5/1982 | Moser | 123/478 |
| 4,345,561 | 8/1982 | Kondo et al. | 123/478 |
| 4,373,187 | 2/1983 | Ishii et al. | 123/480 |
| 4,387,429 | 6/1983 | Tamauchi et al. | 123/478 |
| 4,389,996 | 6/1983 | Taegashi et al. | 123/478 |
| 4,389,997 | 6/1983 | Nakano et al. | 123/478 |
| 4,403,584 | 9/1983 | Suzuki et al. | 123/480 |
| 4,418,673 | 12/1983 | Tominori et al. | 123/478 |

Primary Examiner—Raymond A. Nelli
Attorney, Agent, or Firm—Antonelli, Terry & Wands

[57] ABSTRACT

An electronically-controlled cylinder fuel supply system in which an injector and an ignition plug are provided for each of combustion chambers, in which on the basis of an instruction signal to an engine and a speed of revolution of the engine, the fuel injection initiation timing and valve open duration of the injector, the ignition timing of the ignition plug and the quantity of suction air are determined through retrieval of values from a map stored in a ROM, in which a throttle valve is controlled such that the suction air quantity measured by an air flow meter coincides with the suction air quantity determined by the map retrieval, and in which the injector is provided with a fuel holding portion for temporarily holding the fuel injected during the lowered pressure of the combustion chamber and a vibration element for vibrating the fuel holding portion to atomize the fuel to thereby scatter the atomized fuel into the combustion chamber.

21 Claims, 35 Drawing Figures

F I G. 13
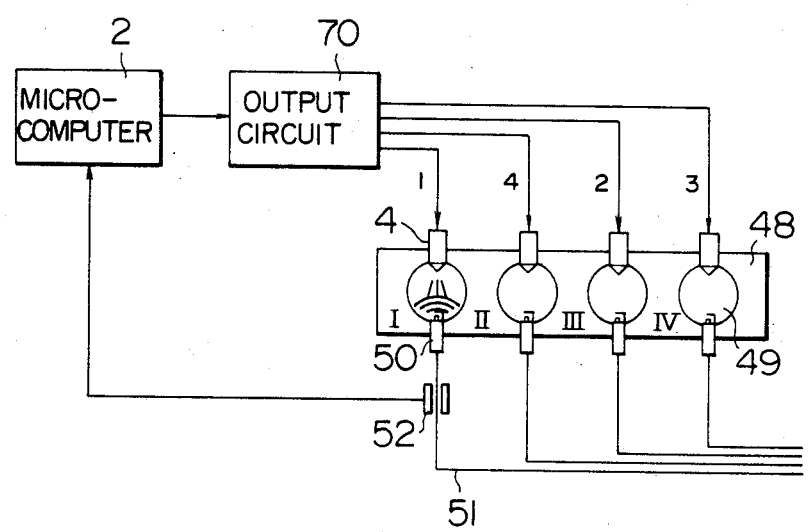

ELECTRONICALLY-CONTROLLED SYSTEM FOR SUPPLYING FUEL INTO CYLINDER

The present invention relates to an electronically-controlled fuel supplying system in which fuel is directly injected into a combustion chamber and ignited thereat and particularly to an electronically-controlled system for supplying fuel into a cylinder in which the concentration of air-fuel mixture can be controlled in the most suitable state for every combustion chamber.

A system for supplying fuel into a cylinder (hereinafter referred to as a cylinder fuel supply system) in which each combustion chamber is provided with an injection valve is disclosed in a Paper 720052 entitled "Exhaust Emission Control by the Ford Programmed Combustion Process-PROCO" published at the Automotive Engineering Congress, Detroit, Mich. Jan. 10~14, 1972. In such a cylinder fuel supply system for an internal combustion engine, it is required that the timing and period of time for fuel injection are set on the basis of an instruction applied to the internal combustion engine so as to be suitable for the running condition of the engine on one hand and a suction air quantity is electronically controlled so that a desired air-fuel ratio can be obtained with respect to a supply fuel quantity which depends on the set fuel injection period of time. Particularly, it is required for this electronic control to attain lean combustion so as to improve the specific fuel consumption. Further, in the cylinder fuel supply system, it is required to facilitatate the performance of fuel injection control because the pressure in the combustion chamber becomes so high in each compression stroke and fuel must be injected under such a high pressurized condition.

An object of the present invention is therefore to provide an electronically-controlled cylinder fuel supply system in which fuel of a suitable quantity for the running condition of an engine is supplied directly into each combustion chamber.

Another object of the present invention is to provide an electronically-controlled cylinder fuel supply system in which fuel of a suitable quantity for the running condition of engine is supplied directly into each combustion chamber and the suction air quantity is controlled so as to obtain a desired air-fuel ratio with respect to the supply fuel quantity.

A further object of the present invention is to provide an electronically-controlled cylinder fuel supply system in which the effect of pressure rising in the combustion chamber at each compression stroke can be reduced.

A still further object of the present invention is to provide an electronically-controlled cylinder fuel supply system in which lean combustion can be achieved to thereby attain remarkable improvement in economy of fuel.

According to the present invention, each combustion chamber is provided with an electronically controlled fuel injector and a spark plug so that the fuel quantity is measured for each combustion chamber so as to be injected into the combustion chamber and spark-ignited thereat, and further provided with a throttle valve, a throttle valve actuator and an air flow meter of the hot wire type so that the suction air quantity entering each combustion chamber is subject to closed-loop control to perform the most suitable control of the concentration of air-fuel mixture in each combustion chamber so as to achieve lean combustion, thereby attaining remarkable improvement in fuel economy.

Further, according to the present invention, the electronically-controlled cylinder fuel supply system comprises a fuel injector provided at its forward end with a fuel holding portion and provided in the vicinity of the fuel holding portion with an ultrasonic vibrator element for vibrating the fuel holding portion so that the fuel held in the fuel holding portion can be injected in an atomized state due to the vibration of the vibrator element.

The above and other objects, features and advantages will be apparent from the following detailed description taking in connection with the accompanying drawings, in which:

FIG. 13 is a diagram illustrating the configuration of the setting of injection cylinders;

Figure 1:
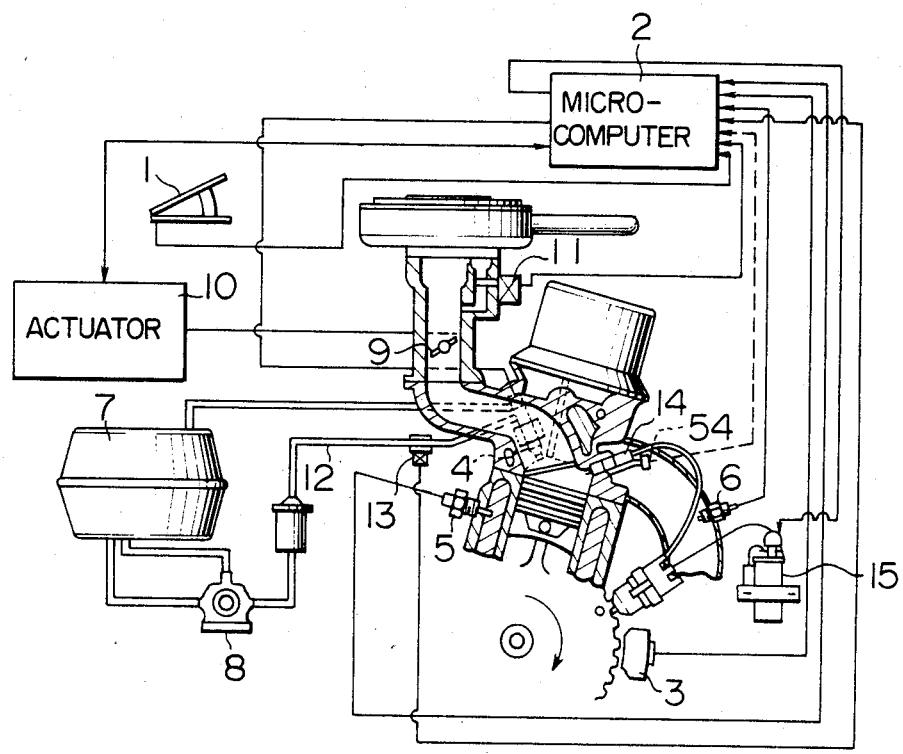
FIG. 1 is a diagram illustrating the whole configuration of the system according to an embodiment of the present invention.

FIG. 1 illustrates an embodiment of the present invention in which the reference numeral 1 designates an accelerator angle sensor, 2 a microcomputer, 3 a crank angle sensor, 4 a fuel injector, 5 a cooling water temperature sensor, 6 an oxygen ($O_2$) sensor, 7 a fuel tank, 8 a high pressure pump, 9 a throttle valve, 10 a throttle valve actuator, 11 an air flow meter constituted by a hot wire sensor, 12 a fuel tube, 13 a pressure sensor of the piezo-resistive type, 14 an ignition plug, and 15 an ignition coil.

Figure 2:
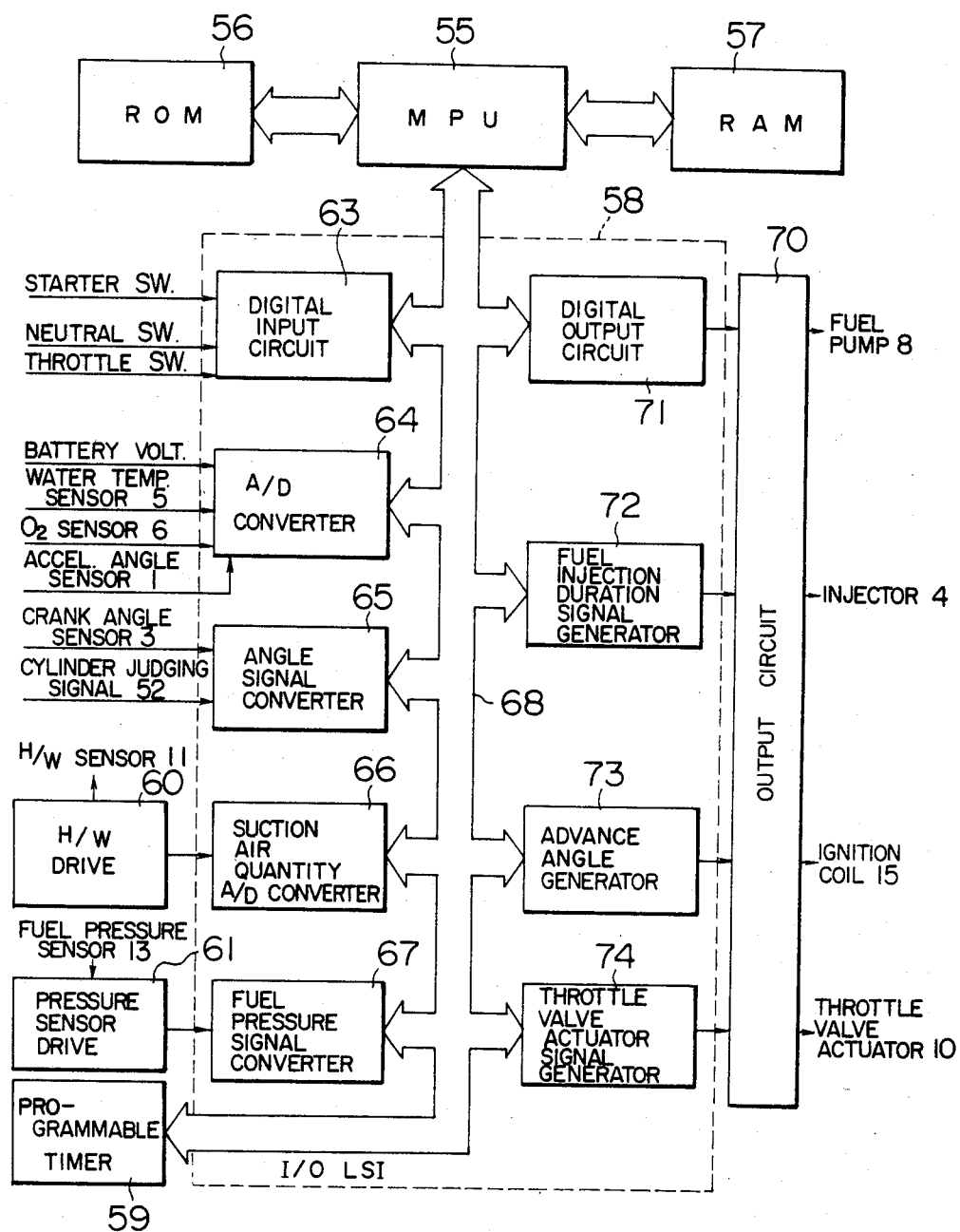
FIG. 2 is a block diagram illustrating the hardware structure of the microcomputer of FIG. 1.

FIG. 2 shows the hardware structure of the microcomputer 2 and the periphery thereof. In FIG. 2, the reference numeral 55 designates a micro-processing unit (MPU), 56 a programable read only memory (ROM), 57 a random access memory (RAM), 58 an input/output large scale integration (LSI), 59 a programable timer for use for setting the timing of retrieval of the air flow quantity, and 60 a hot wire sensor driving circuit for supplying a control current for maintaining the hot wire sensor 11 at a predetermined value, the control current value depending on the suction air quantity. The reference numeral 61 designates a pressure sensor driving circuit for supplying a predetermined voltage to the fuel pressure sensor 13 of the piezo-resistive type and detecting the change in current depending on the change in pressure.

Now, the structure of the input/output LSI 58 will be described. In the input/output LSI 58, a digital input circuit 63 receives digital signals from a start switch which operates at the engine start, a neutral switch for a neutral condition such as an idling operation and a throttle switch for detecting the on/off status of the throttle valve 9. An A/D converter circuit 64 A/D-converts a battery voltage and analog signals from the water temperature sensor 5, the $O_2$ sensor 6 and the accelerator angle sensor 1. An angle signal converter circuit 65 receives a pulse signal from the crank angle sensor 3 and a cylinder judging signal from a magnetic pickup which will be described later. A suction air quantity A/D converter circuit 66 A/D-converts a signal from the hot wire sensor driving circuit 60. A fuel pressure signal converter circuit 67 A/D-converts a signal from the pressure sensor driving circuit 61. The digital signals from the circuit 63 to 67 are fetched into the MPU 55 through a bus 68 and, if necessary, are stored into the RAM 57. A digital output circuit 71, a fuel injection timing signal generating circuit 72, an ignition advanced angle generating circuit 73 and a throttle actuator signal generating circuit 74, respectively, produce control signals on the basis of the data calculated in the MPU 55. These control signals are supplied through an output circuit 70 to the fuel pump 8, the injector 4, the ignition coil 15 and the throttle valve actuator 10 for controlling the same.

Figure 3:
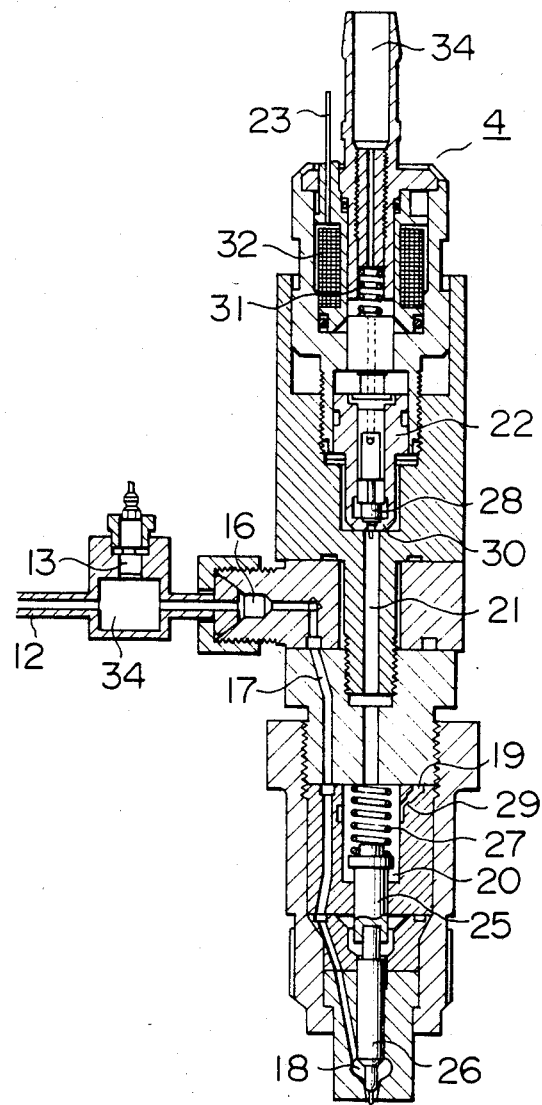
FIG. 3 is a cross-section illustrating the configuration of an embodiment of the injector of FIG. 1.

FIG. 3 shows the configuration of the high pressure fuel injector 4 employed in the system of the embodiment. The high pressure fuel is supplied into a reserve well 18 from the fuel tube 12 through a fuel inlet 16 and a fuel path 17. At the same time the fuel passes to an accumulator 20 through an annular path 19 and a fixed orifice 29. The accumulator 20 communicates a pilot valve 22 through a fuel path 21. An input terminal 23 of the pilot valve 22 is supplied with a control signal from the microcomputer 2 and a drain hole 24 of the same returns fuel to the fuel tank 7. Although the fuel pressure in the reserve well 18 is equal to that in the accumulator 20 during the closed state of the pilot valve 22, a needle 26 is closed due to the force of a spring 28 as well as the difference in the pressure receiving area between a piston 25 and the needle 26. Thereafter, when a valve opening signal is applied to the input terminal 23, a needle valve 28 is moved upwardly to open the passage so that the fuel in the accumulator 20 comes out of the drain hole 24 through the fuel path 21 and the pilot valve 22. Thus, the fuel pressure in the accumulator 20 decreases. The fuel pressure in the reserve well 18, however, is maintained as it was without decreasing owing to the throttling effect of the fixed orifice 29 connecting the accumulator 20 and the reserve well 18 to each other. Thus, the needle 26 is moved upwardly to inject the fuel because the force of upward movement of the needle 26 overcomes the force of the spring 27, etc. Thereafter, when the needle 28 of the pilot valve 22 is closed again, the fuel pressure comes back to the previous state and the needle 26 is closed to end the injection. The feature of this fuel injector is in that the force applied to the needle 28 may be reduced by selecting a valve seat 30 of the pilot valve 22 to be small even if the supply fuel pressure is high, so as to make it possible to weaken the force of a spring 31 to thereby reduce a coil 32 in capacity and in size.

Figure 4:
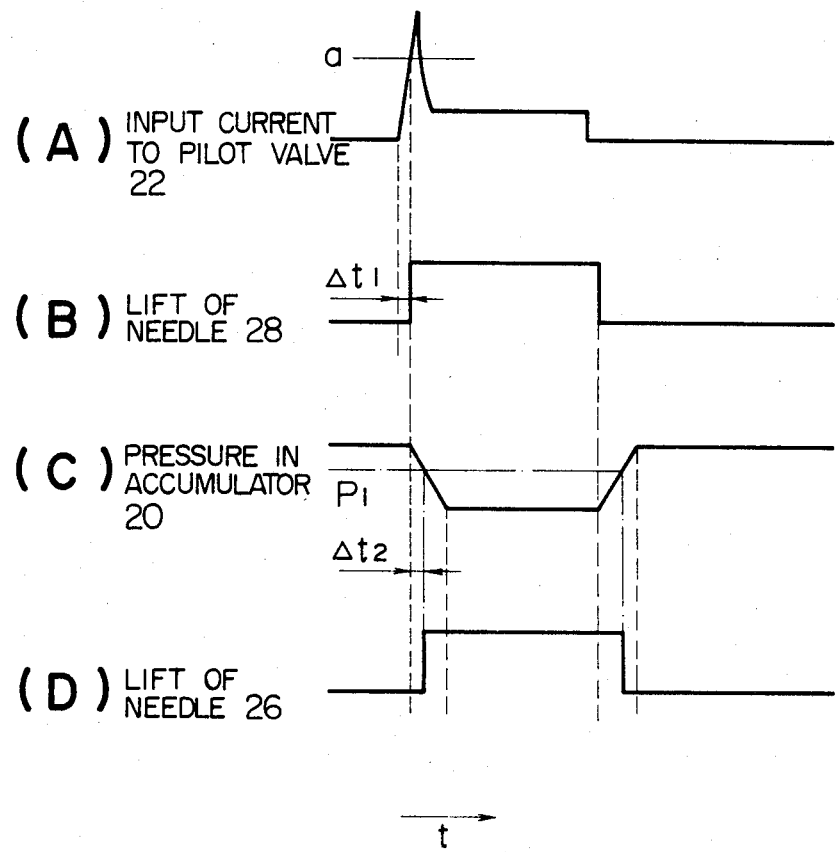
FIGS. 4A through 4D are a time chart for explaining the operation of the injector of FIG. 3.

FIG. 4 shows the operation of the injector of FIG. 3. In the drawing, (A) shows a waveform of the current supplied to the input terminal 23 of the pilot valve 22, (B) shows the lifting state of the needle 28 of the pilot valve 22, (C) shows the change of the fuel pressure in the accumulator 20 and (D) shows the lifting state of the needle 26. As seen in the drawing, the lifting of the needle 28 is delayed by $\Delta t_1$ from the beginning of application of the current to the input terminal 23 because the needle 28 is lifted when the current of FIG. 4 (A) has reached a value a producing an electromagnetic force which can overcome the force of the spring 31 after the beginning of application of the current. The pressure in the accumulator 20 begins to come down from the time at which the needle 28 has been lifted, as shown in FIG. 4 (C). When the pressure in the accumulator 20 has come down to $P_1$, the needle 26 overcomes the force due to the fuel pressure and is lifted as shown in FIG. 4 (D) with a delay of $\Delta t_2$ from the beginning of lowering of the pressure in the accumulator 20. That is, there is a delay of $\Delta t_1 + \Delta t_2$ from the time of beginning of current application to the time of fuel injection. The correction for the delay will be described later. When the current of FIG. 4 (A) becomes zero, the pressure in the accumulator recovers as shown in FIG. 4 (C) and when has reached $P_1$ again the needle 26 is closed.

Figure 5:
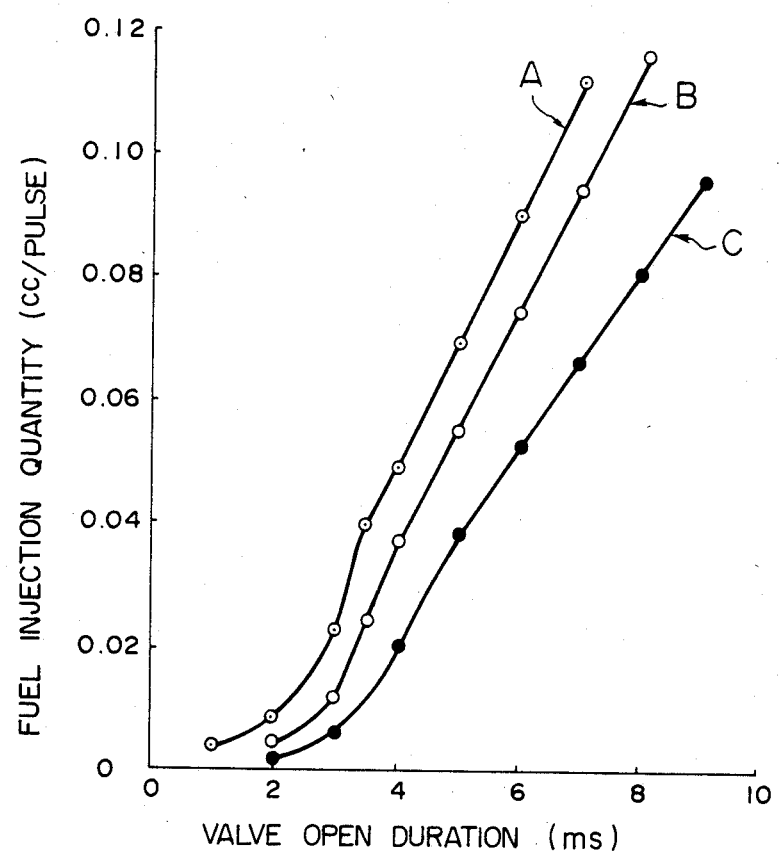
FIG. 5 is a graph showing the fuel injection quantity with respect to the valve open duration.

FIG. 5 shows as the result of actual measurement, the relation between the valve open duration according to a signal instruction and the actual fuel injection quantity. Since any desired inclination characteristic of the relation curve of FIG. 5 by changing the fixed orifice 29 in the diameter among the smallest one (A), the largest one (C) and an intermediate one (B) as shown in FIG. 5, any requirement for the performance of engine, for example a high revolution speed, a high output, or the like, can be satisfied. The reason why the fuel injection quantity increases as the diameter of the orifice is made to be smaller is that the delay of the valve open duration becomes smaller while the delay of valve closure becomes larger. Since it is possible to obtain the maximum fuel injection quantity of 0.1 cc/pulse or more, it is possible to employ such a fuel as alcohol or the like which is low in calorific power and which requires a large fuel injection quantity. Further, since such a fuel injection quantity can be attained within 6 ms, the revolution speed of about 5000 rpm can be accommodated.

Figure 6:
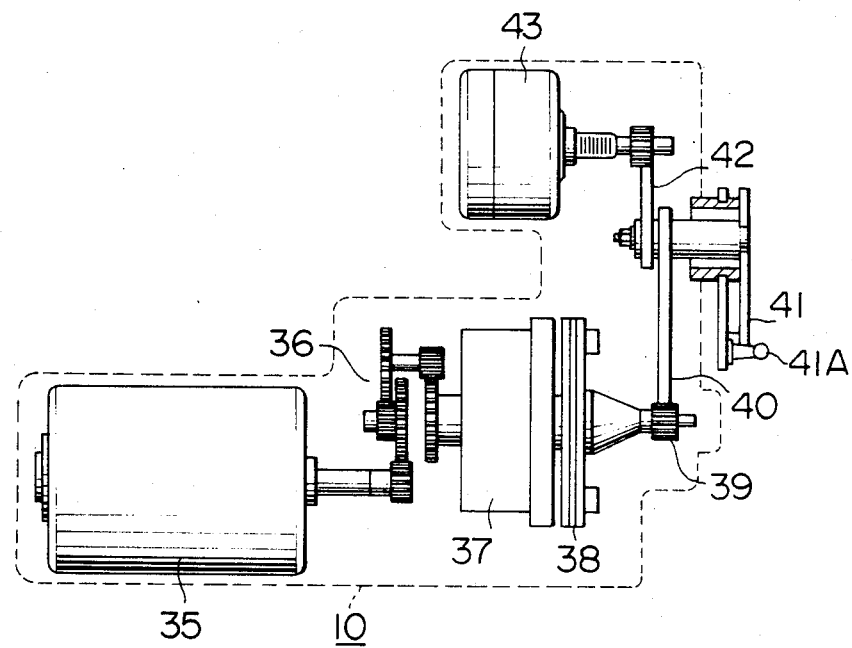
FIG. 6 is a diagram illustrating the configuration of the throttle valve actuator of FIG. 1.

FIG. 6 shows the configuration of the throttle valve actuator 10. A servo-motor 35 is a reversible one and the rotation of the servo-motor 35 is transmitted to a rotor 37 after it is decelerated at a proper ratio by means of a gear mechanism 36. Then the rotation is transmitted to a pinion 39 through an electromagnetic clutch 38 to actuate a sector gear 40 to rotate a throttle drive plate 41 to thereby pull a wire attached to a pin 41A to operate the throttle valve 9. The rotation is transmitted through a sector gear 42 to a potentiometer 43 to detect the opening of the throttle valve 9. The electromagnetic clutch 38 is provided for the purpose of safety and operates such that in case the engine revolution speed rises abnormally, the clutch is deenergized to close the throttle valve 9 so as to inhibit the suction of air. The potentiometer serves to detect the fully opened/closed position of the throttle valve 9 and produces a signal so as to stop the revolution of the servomotor 35 when the fully opened/closed position of the throttle valve has been reached.

In this embodiment, the driver's request is detected by a potentiometer provided on the accelerator angle sensor 1. This request is then stored in the RAM 57 of the microcomputer 2 through the A/D converter circuit 64. The number of revolution calculated by the angle signal converter circuit 65 on the basis of the period of the pulse signal from the crank angle sensor 3 is also stored in the RAM 57. On the basis of these accelerator angle and the number of revolution and by using a map stored in the microcomputer 2, a desired fuel quantity, that is a desired valve open duration of the fuel injector 4 attached directly in the combustion chamber, is determined and produced.

Figure 7:
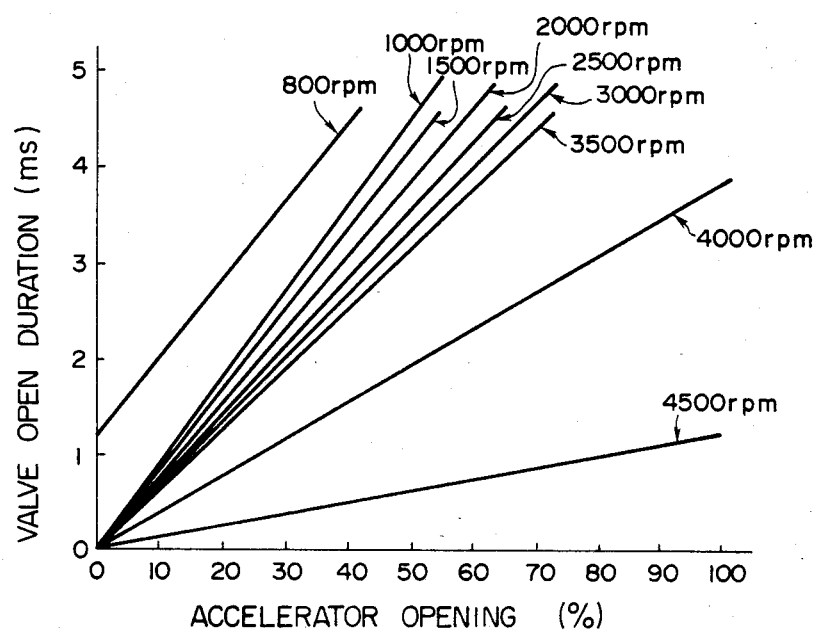
FIGS. 7 and 8 are maps stored in the ROM for retrieving the valve open duration and suction air quantity in accordance with the running condition of the engine.

FIG. 7 shows a map stored in the ROM 56 of the microcomputer 2 for the purpose of determination of a desired fuel injection quantity, that is a desired valve open duration, of the fuel injector 4, which is the driver's request, on the basis of the accelerator opening and the number of revolution. Here, the characteristic of the fuel injector as shown in FIG. 5 is taken into consideration. That is, assuming now that the accelerator opening is 50% and the number of engine revolution is 4000 rpm for example, a desired valve open duration of the fuel injector 4 of about 1.9 ms is obtained on the basis of the accelerator opening 50% on the characteristic curve of 4000 rpm in FIG. 7.

Since the signals from the cooling water temperature sensor 5 and the $O_2$ sensor 6 are fetched into the microcomputer 2 through the A/D converter circuit 64, a closed loop control can be performed on the basis of the output of the $O_2$ sensor 6 so as to correct the valve open duration of the fuel injector 4 such that the air-fuel ratio is made to the rich during starting operation of the engine. The fuel is supplied to the fuel injector 4 from the fuel tank 7 through the high pressure pump 8.

The system is provided with the throttle valve 9, the throttle valve actuator 10 and the air flow meter of the hot wire type or hot wire sensor (hereinafter referred to as H/W sensor) 11 for detecting the quantity of suction air, for the purpose of the control of suction air quantity on the basis of the valve open duration of the injector 4 and the number of revolution by using the map stored in the ROM 56 of the microcomputer 2 such that the concentration of air-fuel mixture in the combustion chamber is controlled to cause the excess air factor $\lambda$ to come the leaner side than the value 1, for example to become $\lambda = 1.2$.

Figure 8:
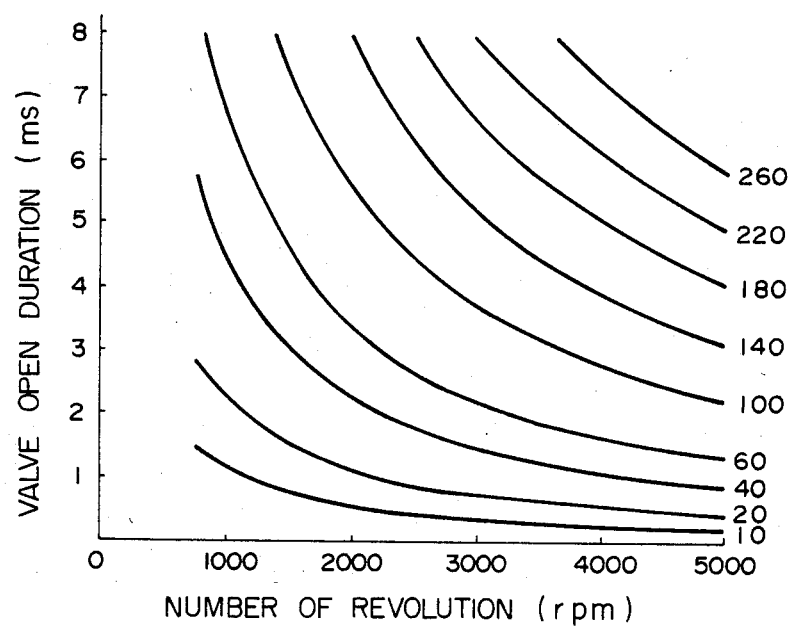

FIG. 8 shows a map for determining a desired valve open duration, that is a desired quantity of air to be drawn into the engine, on the basis of the fuel injection quantity and the number of revolution. Here, the ratio of the injected fuel quantity to the suction air quantity is set such that the excess air factor $\lambda = 1.2$ so that air-fuel ratio becomes lean side than the theoretical air-fuel ratio. Accordingly, for example, if the valve open duration is determined to be 4 ms from FIG. 7 on the basis of the accelerator opening at the engine revolution of 2000 rpm, the desired suction air quantity is obtained to be about 70 Kg/hr from the map of FIG. 8. The MPU 55 performs the closed loop control to cause the throttle valve actuator 10 to operate the throttle valve 9 on the basis of the output of the H/W sensor 11 such that the obtained desired quantity of air is drawn into the engine.

Figure 9:
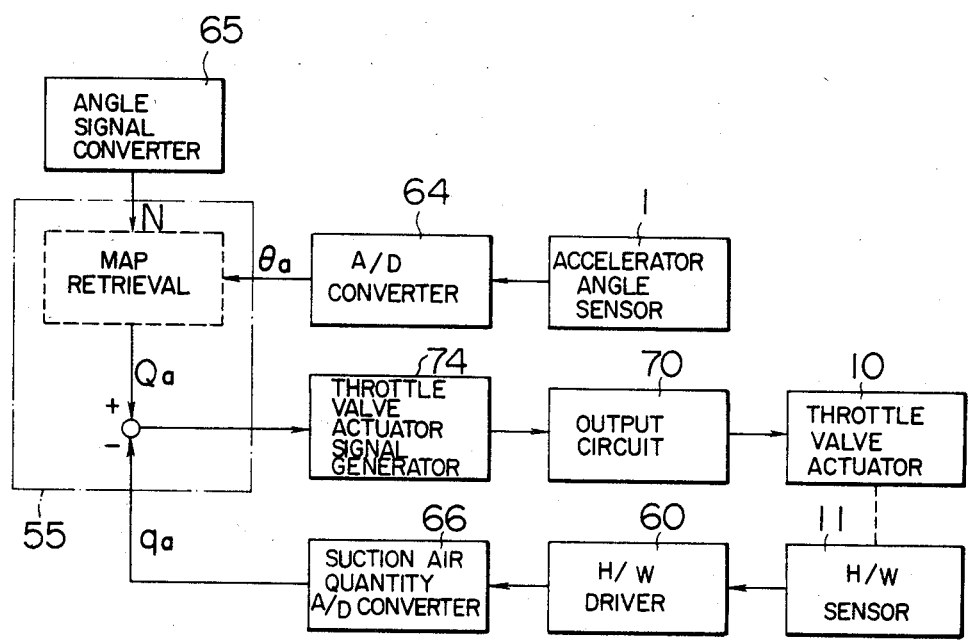
FIG. 9 is a block diagram illustrating the closed loop control circuit for suction air quantity control.

FIG. 9 is a block diagram for closed-loop controlling the throttle valve actuator 10 so as to make the suction air quantity coincident with the desired value obtained from FIG. 8. The instruction signal due to the driver's actuation and detected by the accelerator angle sensor 1 is converted into a digital signal $\theta_a$ by the A/D converter circuit 64 and supplied to the MPU 55. On the other hand, the number of engine revolution N is supplied to the MPU 55 from the angle signal converter circuit 65. The MPU 55 performs retrieval on the map as shown in FIG. 8 so as to determine the desired suction air quantity $Q_a$ on the basis of the accelerator signal $Q_a$ and the revolution number N. On the other hand, the actual suction air quantity $q_a$ detected by the H/W sensor 11 and the H/W sensor drive circuit 60 is fed-back to the MPU 55 through the suction air quantity converter circuit 66. The MPU 55 compares the suction air quantity $Q_a$ obtained through the map retrieval with the detected actual suction air quantity $q_a$ so as to obtain the difference therebetween. On the basis of the difference signal of the MPU 55, the throttle valve actuator signal generating circuit 74 produces a control signal to operate the throttle valve actuator 10 through the output circuit 70. As the result of this, the throttle valve 9 is rotated to control the actual suction air quantity in the direction such that the actual suction air quantity approaches the map retrieved value $Q_a$. The thus controlled actual air quantity is detected by the H/W sensor 11. In this manner, the suction air quantity is subject to the closed loop control.

Figure 10:
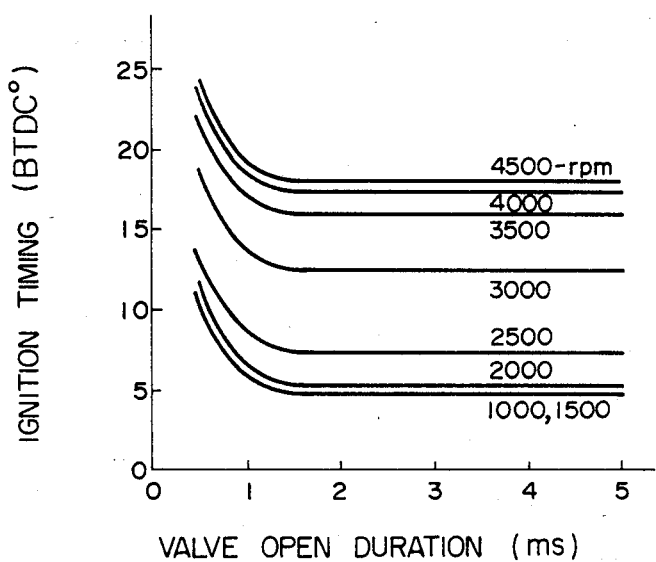
FIG. 10 is a map for retrieving the ignition timing.

In this system, the ignition plug 14 is provided to spark-igniting the air-fuel mixture. The desired ignition timing at this time is determined on the basis of the valve open duration of the fuel injector and the detected number of engine revolutions per unit time and supplied to the ignition plug 14 through the ignition coil 15 by the microcomputer 2. FIG. 10 shows a map stored in the ROM 56, for determining the ignition timing on the basis of the valve open duration and the number of detected engine revolutions. In FIG. 10, the ignition timing is expressed in B.T.D.C. degrees or in degrees of the advanced angle before the top dead center.

Figure 11:
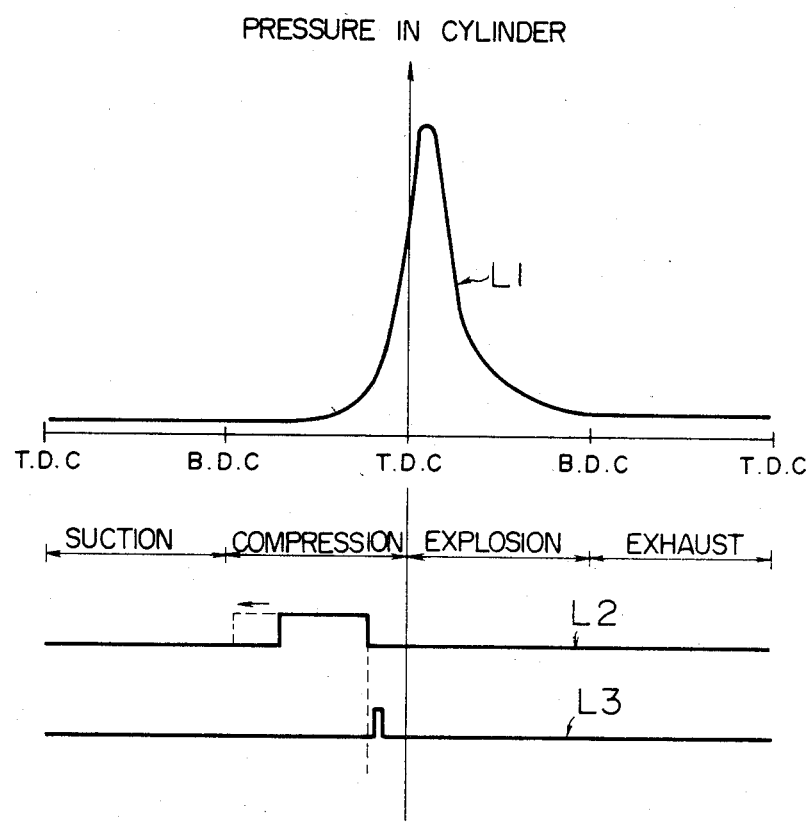
FIG. 11 is a diagram for explaining the relation between the injection timing and the ignition timing.

FIG. 11 is a diagram for facilitating the explanation of the control of the injection timing and the ignition timing. In the drawing, the curve $L_1$ shows the change of the pressure in the cylinder with respect to the crank angle, the diagram $L_2$ shows the open/close timing of the injection valve and the diagram $L_3$ shows the ignition timing. As seen in the drawing, the ignition is performed after the injector has been closed so as to attain a uniformity of fuel in the cylinder and to reduce the load applied to the injector. If the ignition and explosion are performed during the fuel injection, the injection valve is exerted with a high explosion pressure in its open state, resulting in a load for the injection valve. Further, when the fuel quantity is to be increased, it is performed by extending the valve open initiation timing to the intake stroke side. That is, only the valve open initiation timing is shifted without changing the valve open termination timing to thereby increase the fuel quantity. The valve open initiation timing may come in the intake stroke.

The injection initiation timing from which fuel is injected from the fuel injector 4 is determined and outputted on the basis of the valve open duration of the injector 4, that is the fuel quantity, by using the map stored in the ROM 56 of the microcomputer 2.

Figure 12:
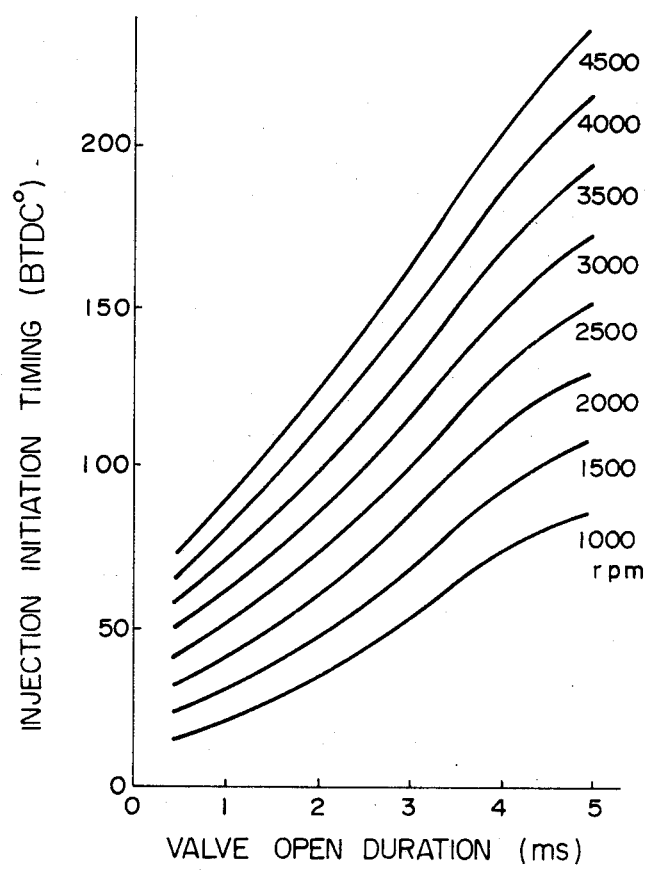
FIG. 12 is a map for retrieving the injection start timing.

FIG. 12 shows a map which is determined taking into consideration the contents of the above-mentioned explanation with respect to FIG. 11 and which is used to determine the injection initiation timing on the basis of the valve open duration and the number of engine revolution. The injection initiation timing is set such that the injection ends before the ignition begins.

In order to compensate for the response delay of the injector 4 or the like as explained with respect to FIG. 4, the actual injection initiation timing is detected by the piezo type pressure sensor 13 provided in the fuel tube 12 immediately before the injector 4 (see FIGS. 1 and 3) and fetched into the microcomputer 2 from the fuel pressure A/D converter circuit 67.

FIG. 3 shows the state that the pressure sensor 13 for detecting the injection timing is attached to the injector 4. If the needle 26 is lifted, the fuel is injected and the pressure in the reserve well 18 is reduced, resulting in reduction of the fuel pressure in a pressure chamber 34. The reduction of fuel pressure in the pressure chamber 34 is detected by the pressure sensor 13 so as to detect the actual injection initiation timing. The thus detected actual injection initiation timing is compared with the desired injection initiation timing retrieved from the map as shown in FIG. 12 so as to perform the closed loop control of the current supply initiation timing to the coil 32 of the injector 4 such that both the actual and desired injection initiation timings are made to be coincident with each other. In the thus performed control, the response delay of $\Delta t_1 + \Delta t_2$ as shown in FIG. 4 can be automatically compensated.

FIG. 13 shows the operation of cylinder judgement in the determination of injection. In FIG. 13, the reference numeral 48 designates an engine having four cylinders 49, Nos. I~IV. In this system, in order to perform the air-fuel ratio control for the respective cylinders 49 of the engine 48, it is necessary to judge into which one of the cylinders the last determined desired quantity of fuel is to be injected. To this end, a magnetic pickup 52 is attached to a high voltage cable 51 connected to an ignition plug 50 for the No. I cylinder and the output signal of the magnetic pickup 52 is used for the cylinder judgement. The MPU 55 successively produces its output signals on the basis of the output signal of the magnetic pickup 52 for successively determining the four injection regions respectively for the four fuel injectors corresponding to four parts divided from 720 degrees of the twice revolutions of the crank shaft. On the basis of the output signals, the fuel injection timing signal generating circuit 72 applies injection signals successively to the respective injectors 4 through the output circuit 70. The numerals 1, 2, 3 and 4 designate the order of injection which coincides with the order of ignition of the respective ignition plugs.

Figure 14:
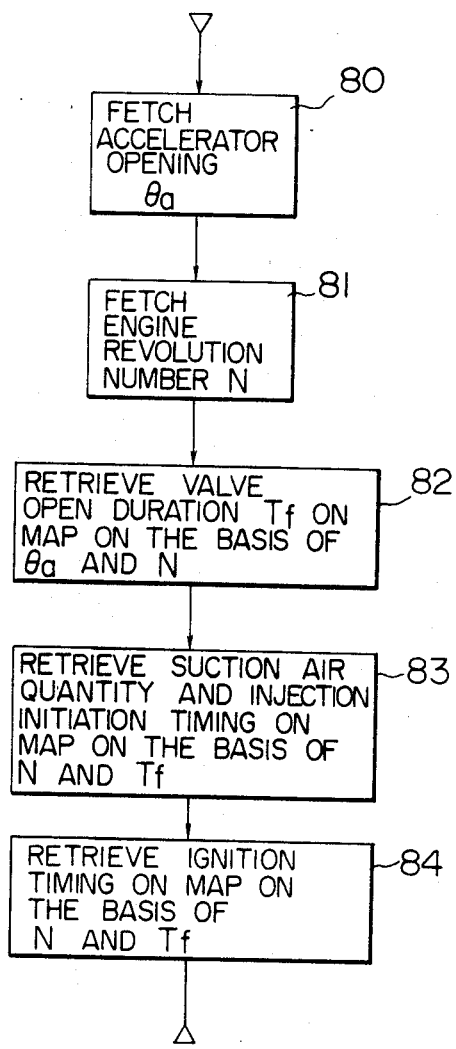
FIG. 14 is a flowchart showing the operations of the fuel system and ignition system.

FIG. 14 is a flowchart of operations of the fuel and ignition systems. In the step 80, the acceleration opening $\theta_a$ is fetched as the driver's request. In the next step 81, the number of engine revolution N is fetched. In the step 82, the valve open duration (that is the fuel quantity) $T_f$ of the injector is determined through retrieval on the map as shown in FIG. 7 on the basis of the accelerator opening $\theta_a$ of the step 80 and the engine revolution number N of the step 81, and in the step 83, the suction air quantity $Q_a$ and the injection initiation timing $T_f$ are determined through the retrieval on the map as shown in FIGS. 8 and 12 on the basis of the valve open duration $T_f$ and the engine revolution number N. In the next step 84, the ignition timing $T_{inj}$ is determined by means of the map of FIG. 10 on the basis of the engine revolution number N and the valve open duration $T_f$.

As described above, according to this enbodiment, the injector 4 and the ignition plug 14 are provided for each of the plural combustion chambers so that the fuel injected into each combustion chamber is ignited by the associated ignition plug 14, and the fuel injection quantity, the injection timing and the ignition timing for each combustion chamber are controlled by means of the microcomputer 2. Further, in order to attain lean combustion, the throttle valve 9, the throttle valve actuator 10 and the H/W sensor 11 are provided for the purpose of closed loop control of the suction air quantity.

Figure 15A:
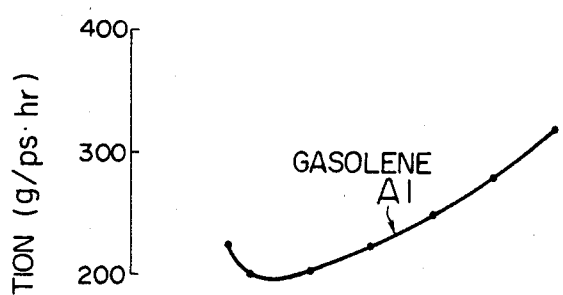
FIGS. 15A, 15B and 15C are graphs showing the experimental results of the system according to the present invention in comparison with the prior art system.
Figure 15B:
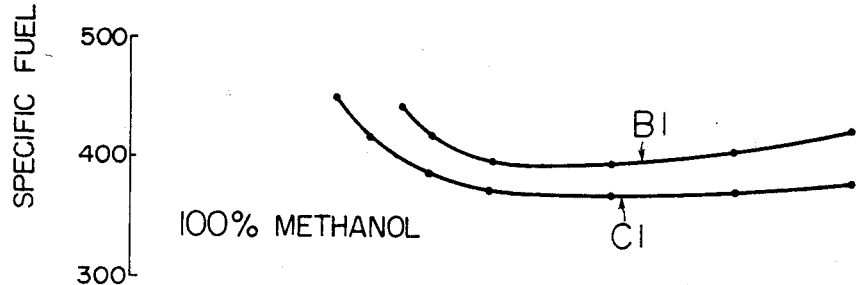
Figure 15C:
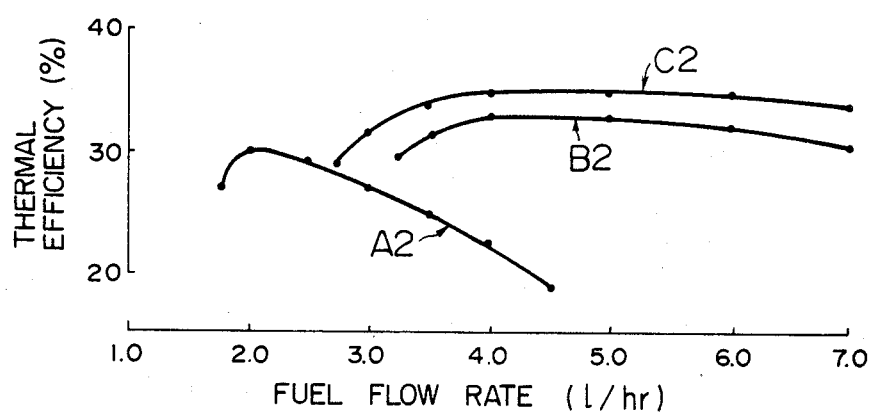

FIGS. 15A, 15B and 15C show the result of comparison between the performance of a conventional gasolene engine provided with a carburetor and that of the system according to this embodiment employing 100% methanol. The remarkable difference between the specific fuel consumption characteristic $A_1$ of the conventional engine (a) provided with a carburetor and the specific fuel consumption characteristics $B_1$ and $C_1$ of the system of the embodiment is due to the difference in calorific power of fuel. The system of the present embodiment is advantageous in that since the fuel injection can be performed when the pressure has become high because of the arrangement of cylinder injection, the compression ratio can be increased, while in the conventional engine having a carburetor, spontaneous ignition may occur when the pressure becomes high. The characteristic $B_1$ in FIG. 15B is of the case where compression ratio is selected to be 8.0 which is the same value as that in the carburetor engine, while the characteristic $C_1$ is of the case where the value of compression ratio is increased to 10. The above-mentioned difference in calorific power is obviated if the specific fuel consumption is converted into thermal efficiency so that as shown in FIG. 15C, the thermal efficiency characteristics $A_2$, $B_2$ and $C_2$ corresponding to the specific fuel consumption characteristics $A_1$, $B_1$ and $C_1$ can be compared on the same graph.

As seen in the drawings, in the characteristics $A_1$ and $A_2$ of the engine having a carburetor, the lowest specific fuel consumption may be only within a narrow region of 2.0~2.5 l/hr of the fuel flow rate and the highest thermal efficiency may be about 30% at largest. On the other hand, the system of the embodiment is advantageous in that since control is made so as to maintain the condition $\lambda=1.2$ in a wide range of fuel flow rate, the lowest specific fuel consumption can be obtained in a wide range of the fuel flow rate (3.5~7.0 l/hr). Further, the highest thermal efficiency may be about 33% at the compression ratio of 8.0, and about 33% at the compression ratio of 10.0, so that the specific fuel consumption can be improved by about 10~20% in comparison with the carburetor engine.

In FIG. 1, the dotted line indicates the case where a cylinder pressure sensor 54 for detecting the combustion pressure in the cylinder is provided in the ignition plug 14. The output signal of the cylinder pressure sensor 54 is supplied to the microcomputer 2 and used for correcting the injection timing.

Figure 16:
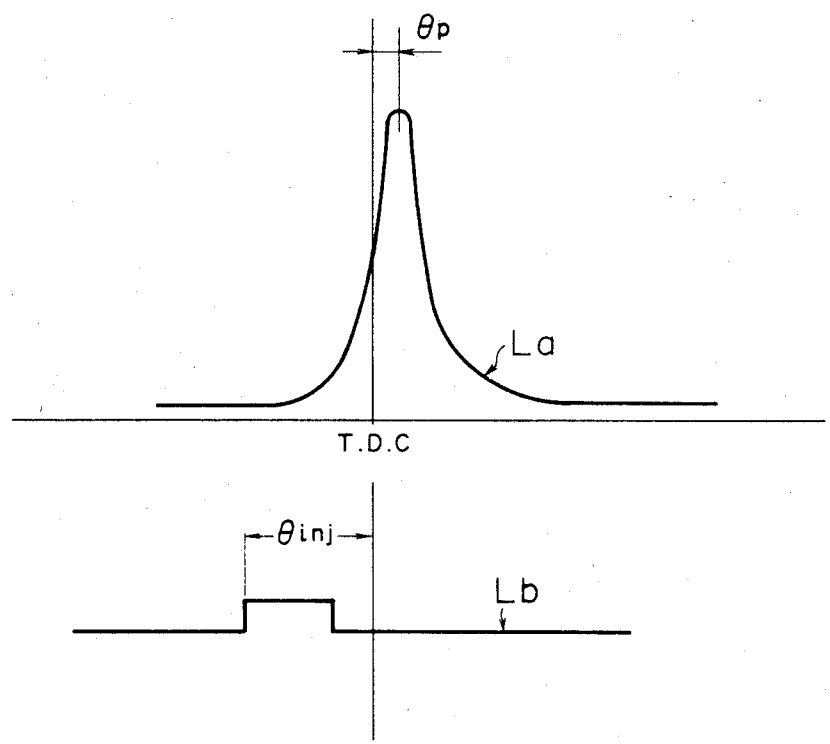
FIG. 16 is a diagram for explaining the principle of correction of injection timing.

FIG. 16 shows the principle of the abovementioned correction of ignition timing, in which the curve $L_a$ designates the change in pressure in the cylinder and the diagram $L_b$ indicates the injection timing. By means of the cylinder pressure sensor, the peak position of the combustion pressure is expressed in degree of the retarded angle from the T.D.C. (A.T.D.C.) $\theta_p$. Considering on the basis of mechanical efficiency of revolution of the engine, it is optimum to select the peak position to be $\theta_p=15°\sim20°$ A.T.D.C. That is, since the peak position may shift depending on the injection initiation timing $\theta_{inj}$, the injection initiation timing $\theta_{inj}$ is compensated such that $\theta_p=15°\sim20°$, thereby attaining the improvement in the engine efficiency.

Accordingly, according to the embodiment, the lean combustion control for each combustion chamber can be achieved to thereby improve the thermal efficiency by 10% in comparison with the conventional gasolene engine having a carburetor under the condition with the same compression ratio (8.0).

Further, according to the embodiment, if the compression ratio is increased to 10.0 making the most of the advantage of the injection directly into cylinder, it is made possible to improve the thermal efficiency by about 20% in comparison with the conventional gasolene engine with a carburetor.

Further, according to the embodiment, various kinds of fuel can be employed because of the provision of injection valve in which the fuel flow rate characteristic can be freely changed in a wide range.

As discussed above, according to the present invention, it is made possible to attain lean combustion to thereby extremely improve the economy of fuel.

Another embodiment according to the present invention will be described hereunder. In the first described embodiment according to the present invention, the injection timing by the injector is set in the later range of compression stroke (25°~45° B.T.D.C.) in order to attain stratified charge. Accordingly, it is required to inject fuel into the combustion chamber with high compression pressure and therefore a high pressure type fuel injector (25~100 Kg/cm) is employed for such a cylinder injection engine of the type as above. Since it is necessary to employ such a high pressure fuel injector, there is a problem that the fuel injection control can not be easily performed and it is a little difficult to reduce the cost of fuel and to perform the control electronically.

According to the second embodiment of the present invention, the fuel discharge by the fuel injector and the injection of the discharged fuel toward the ignition plug can be separately performed at different timings. Accordingly, the fuel injection from the fuel injection valve can be performed at the timing in the intake air stroke or in the beginning of the compression stroke at which the pressure in the cylinder is substantially equal to the atmospheric pressure, and after a predetermined period of time has elapsed, the fuel held in a fuel holding portion is vibrated by an ultrasonic vibration element to be atomized so that the atomized fuel is injected toward the ignition plug in the combustion chamber so as to be ignited by the ignition plug, thereby attaining the stratified charge.

Figure 17:
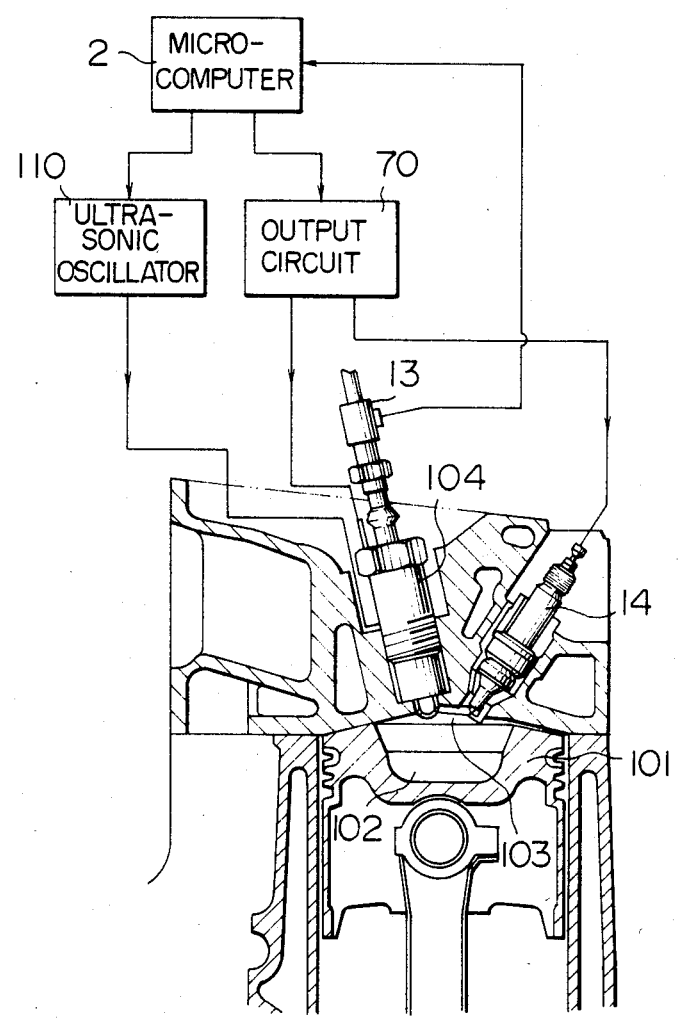
FIG. 17 is a cross-section illustrating the schematic configuration of another embodiment of the present invention.

Referring to FIGS. 17 et seq., the second embodiment of the invention will be described.

Figure 18:
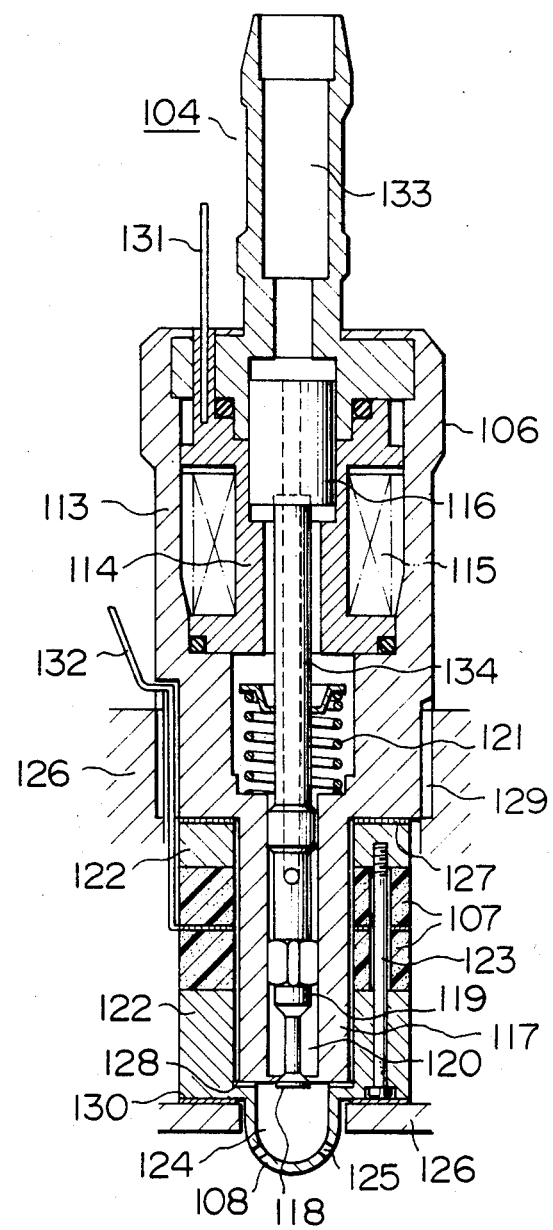
FIG. 18 is a cross-section illustrating the configuration of injector of FIG. 17.

FIG. 17 is a cross-section illustrating the configuration of the cylinder injection engine according to the second embodiment. As seen in the drawing, a cavity 102 is formed at the head portion of a piston 101. Further, a fuel injector 104 and an ignition plug 14 are attached in a combustion chamber 103. In this embodiment, as shown in FIG. 18, the fuel injector 104 is constituted by a fuel injection valve 106 and an ultrasonic vibration element 107, and a dome-like mask 108 which serves as a fuel holding portion for temporarily holding the injected fuel is attached to the tip end of the fuel injection valve 106. Further, the engine comprises an output circuit 70 connected to the fuel injection valve 106 for driving the injection valve and an ultrasonic oscillator 110 connected to the ultrasonic vibration element 107. The output circuit 70 further transmits an ignition signal to the ignition plug 14. The output circuit 70 and the ultrasonic oscillator 110 are connected to a microcomputer 2 by which the injection valve 106 and the vibration element 107 are actuated in the calculated or mapped timing so that the fuel can be ignited in a proper timing.

In FIG. 17, a pressure sensor 13 operates in the same manner as the sensor 13 in FIGS. 1 and 3.

In the thus arranged engine, a particular structure of the fuel injector 104 is shown in FIG. 18. That is, the fuel injection valve 106 constituting the fuel injector 104 is a low pressure type electromagnetic valve provided, within a casing 113, with an electromagnetic coil 115 wound on a yoke 114 and a plunger 116 actuated by the coil 115. A small size nozzle portion 117 is provided at the front end of the casing 113, and a valve body of the poppet type 118 is attached at the front ent of the nozzle portion 117. The valve body 118 is coupled with the plunger 116 through a needle 119 so as to perform open/close operation depending on the reciprocating movement of the plunger 116. In this case, as shown in the drawing, the valve body 118 projects from the front end of the nozzle portion 117 so as to make it possible to discharge fuel out of a fuel chamber 120 formed in the nozzle portion 117 when the plunger is moved downward. The valve body 118 is, however, normally made to be in its closed state by means of the needle 119 which is upward urged by a spring 121. Further, the supply of fuel into the fuel chamber 120 is performed through a fuel inlet 133 formed at the top portion of the casing 113 and a fuel path 134 formed in the axially central portion of each of the plunger 116 and the needle 119.

In the outer periphery of the nozzle portion 117 of the fuel injection valve 106, the above-mentioned ultrasonic vibration element 107 is attached. The vibration element 107 is attached with a predetermined gap between it and the nozzle portion 117 and supported by upper and lower pressing members 122 placed at its upper and lower ends. That is, the vibration element 107 is fixed by a bolt 123 which is extended from the lower pressing member 122 through the vibration element 107 and threaded at its end into the upper pressing member 122. A dome-like mask 108 is integrally formed on the lower pressing member 122 such that the mask 108 covers the front end of the nozzle portion 117. Thus, the fuel injected from the fuel injection valve 106 is temporarily received in a cavity 124 of the mask 108. Injection holes 125 are formed in the mask 108, in the number corresponding to the ignition plugs 14. The injection holes 125 are directed toward the ignition plugs 14 (in case there are two ignition plugs in one combustion chamber), in the combustion chambers 103.

The fuel injector 104 constituted by the fuel injection valve 106 and the ultrasonic vibration element 107 is attached to the engine body 126. That is, on the outer periphery of the nozzle portion 117 of the injection valve 106, the upper pressing member 122 supporting the vibration element 107 is made to be abutted against a shoulder portion between the casing 113 and the nozzle portion 117 through an anti-vibration material 127. The nozzle portion 117 is abutted at its front end surface to the inner wall surface of the mask 108 through a seal member 128. The injector 104 is inserted into the engine body 126 with the mask 108 placed at its forward end and directed to the combustion chamber, and fixed to the engine body 126 through a threaded portion 129 formed in the outer periphery of the casing 113. The injector is attached such that only the mask 108 is projected into the combustion chamber 103 and a seal member 130 is provided between the front end surface of the lower pressing member 122 and the engine body 126 so as to seal the combustion chamber 103.

In the fuel injector 104, an input terminal 131 to the electromagnetic coil 115 and another terminal 132 connected to the ultrasonic vibration element 107 are led out of the injector 104 and connected to the above-mentioned output circuit 70 and the ultrasonic oscillator 110 respectively.

The operation of the thus arranged cylinder fuel supply system is performed in the following manner. The fuel supplied into the fuel injection valve 106 from the fuel inlet 133 is led to the fuel chamber 120 through the fuel path 134 formed in each of the plunger 116 and the needle 119. Upon the application of a valve open signal to the input terminal 131 from the output circuit 70 under this condition, the plunger 116 is moved downward by means of the coil 115 so that the valve body 118 is also moved downward together with the needle 119 to thereby open the valve. Thus, the fuel in the fuel chamber 120 is discharged and temporarily held in the cavity 124 of the mask 108. Thereafter, upon the reception of a valve close signal, the plunger 116 is moved upward by means of the spring 121 to thereby close the valve. Thus, the fuel measured correspondingly to the valve open duration is temporarily held in the cavity 124 of the mask 108.

After a predetermined period of time has elapsed from the time at which the fuel had been injected into the cavity 124, an output signal is applied to the terminal 132 so that the ultrasonic vibration element 107 is vibrated. When the vibration element 107 vibrates, each of the seal members 128 and 130 becomes a passive state point or node, with the forward end of the mask 108 made a free end which may vibrate violently. Due to this vibration the fuel held in the cavity 124 is atomized and discharged out of the injection hole 125. Since the injection hole 125 is directed toward the ignition plug 14, the thus discharged atomized fuel is concentrated in the vicinity of the ignition plug 14.

Then, when an ignition signal is produced from the output circuit 70, the fuel is ignited by the ignition plug 14.

Thus, in the cylinder injection engine, the discharge of measured fuel into the combustion chamber 103 and the injection of the thus discharged and atomized fuel toward the ignition plug 14 are separately performed and particularly the atomization of fuel is performed by the action of the ultrasonic vibration element 107, so that combustible air-fuel mixture is concentrated in the vicinity of the ignition plug 14 in cooperation with the effect of the cavity 102 of the piston 101 to attain stratified charge to thereby make it possible to achieve lean combustion with lean total air-fuel ratio.

Figure 19A:
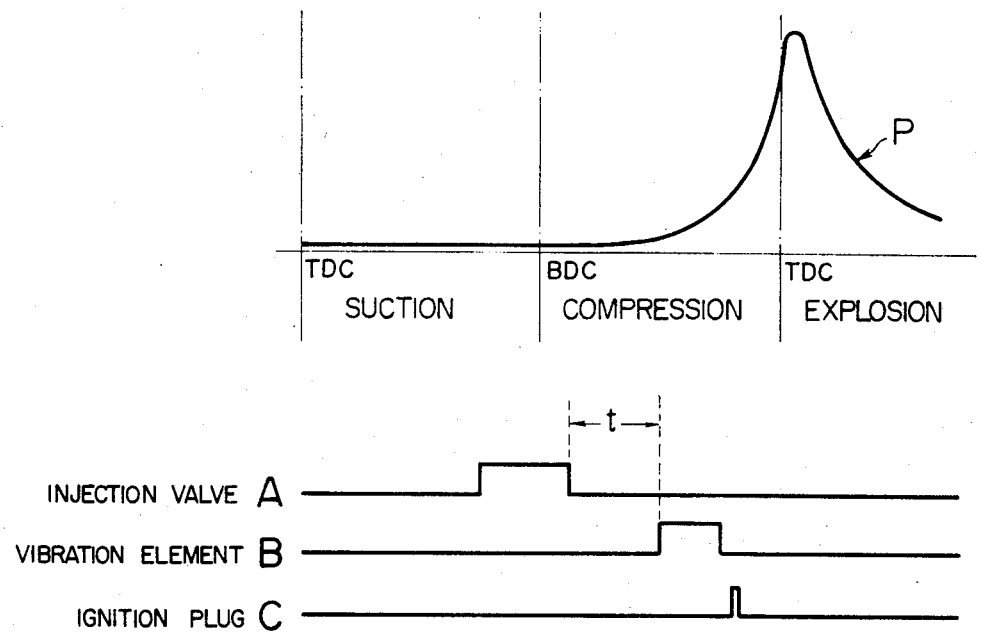
FIGS. 19A, 19B and 19C are time charts for explaining various examples of operation of the injection valve as shown in FIG. 18.

The timing of operation of each of the fuel injection valve 106 and the ultrasonic vibration element 107 will be now described by referring to FIG. 19A which shows the relation among the pressure P in the cylinder in the combustion chamber 103, the operation timing A of the fuel injection valve 106, the operation timing B of the ultrasonic vibration element 107 and the operation timing C of the ignition plug 14. As shown in FIG. 19A, the injection valve 106 is opened in the intake air stroke or in the beginning of the compression stroke so as to inject the fuel into the cavity 124 of the mask 108. Thereafter, after a predetermined period of time t has elapsed, the vibration element 107 is caused to vibrate to supply the atomized fuel into the combustion chamber 103 and then the vibration is stopped. Then the thus supplied fuel is ignited by the ignition plug 14 to be exploded. Thus, it will do to cause the injection valve to inject fuel in the intake air stroke or in the beginning of the compression stroke in which the pressure P in the cylinder is near or equal to the atmospheric pressure to make unnecessary any injection device of the high pressure type so as to make it possible to perform injection at a low pressure (for example $2 \sim 3$ Kg/cm$^2$). In this case, since the valve body 118 of the fuel injection valve 106 is of the poppet type, the valve is not opened even if combustion pressure is exerted onto the forward end of the needle 119 in the compression or explosion stroke differing from the pintle type valve, thereby making it possible in an optimum manner to employ a low pressure valve for injecting fuel directly into cylinder.

As described above, in the cylinder injection engine according to this embodiment, a low pressure type valve is employed as the fuel injection valve 106 is atomized by the ultrasonic vibration element 107, and the atomized fuel is injected toward the ignition plug 14, so that it is made possible to attain the stratified charge, to remarkably reduce the cost of the fuel supply system, to attain complete electronical control of the cylinder fuel supply system and to reduce the cost of the electronically controlled system.

Figure 19B:
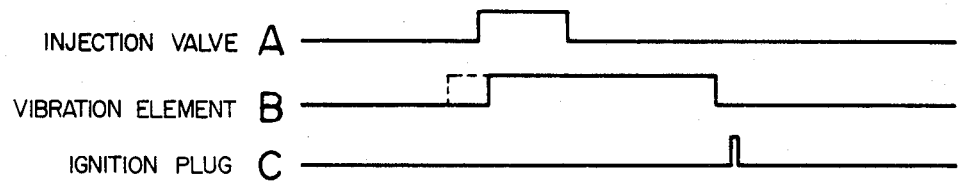
Figure 19C:
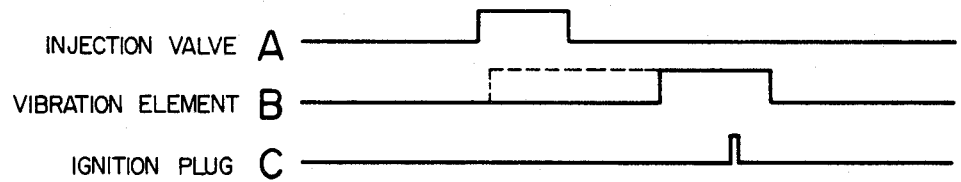

FIGS. 19B to 19C show other embodiments in which the operation timing of the ultrasonic vibration element 107 is changed. FIG. 19B illustrates the case where the vibration element 107 is caused to begin to vibrate in or prior to the valve open duration of the injection valve 106 and ignition is performed after the vibration is stopped. FIG. 19B shows, on the other hand, the case where the vibration element 107 is caused to begin to vibrate in or after the valve open duration of the injection valve 106 and the vibration is stopped after the ignition has been performed. In this case, such an effect that the ignition process and the initial combustion can be accelerated owing to the combustion accelerating characteristic peculiar to the ultrasonic wave can be obtained.

Figure 20A:
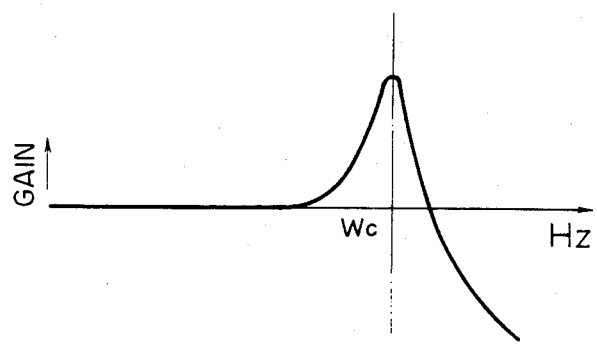
FIGS. 20A and 20B are graphs showing the basic characteristics of the ultrasonic vibrator element.
Figure 20B:
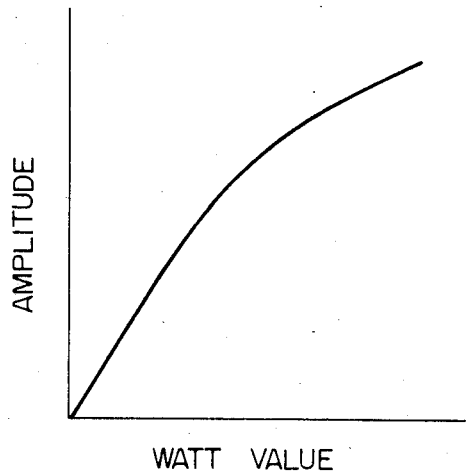
Figure 21A:
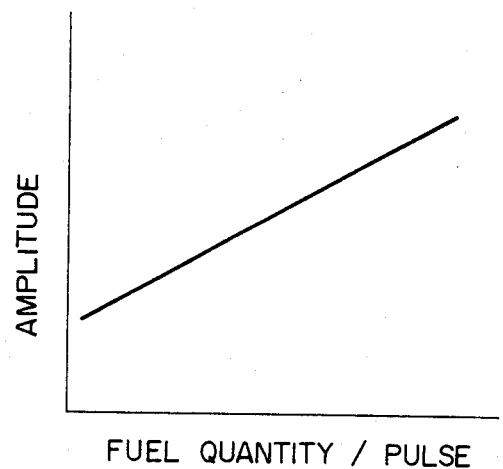
FIGS. 21A and 21B are graphs showing the characteristics of the ultrasonic vibrator element with respect to the fuel quantity.
Figure 21B:
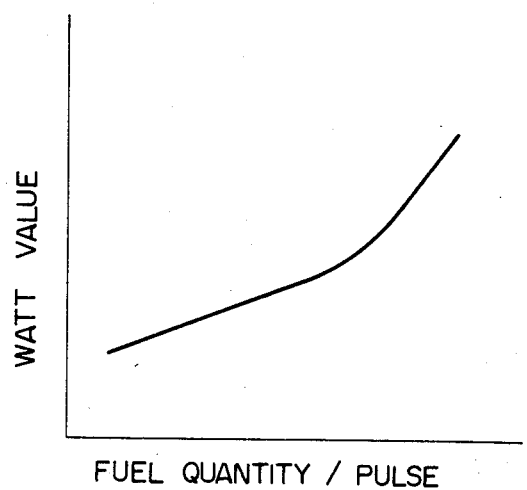
Figure 22:
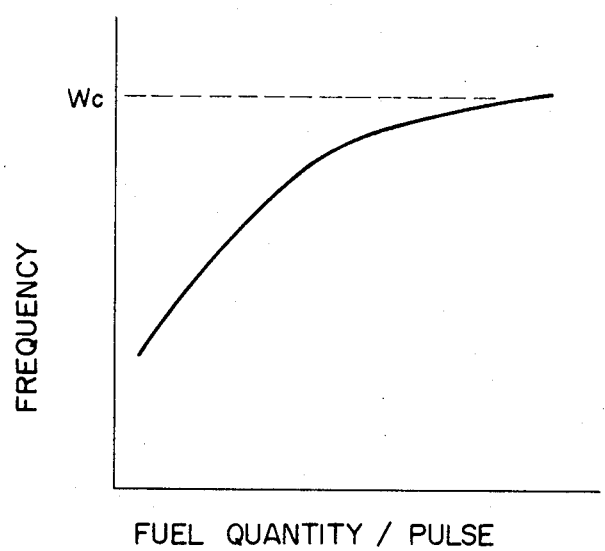
FIG. 22 is a graph showing the frequency characteristic of the ultrasonic vibrator elment with respect to the fuel quantity.

The control for the ultrasonic vibration element 107 is performed in the following manner. FIGS. 20A and 20B show the frequency characteristic and the amplitude characteristic respectively. As shown in the drawings, at a certain frequency $w_c$ (resonance frequency), the gain as well as the processing ability of fuel atomization of the vibration element 107 become maximum. Accordingly, this resonance frequency $w_c$ is used in this embodiment. Further, since the amplitude changes depending on the input power (watt) as shown in FIG. 20B, the processing ability and the spray characteristic are controlled by changing the amplitude, that is the watt value of input power, in the present embodiment, when the fuel quantity changes. The control of watt value is achieved by changing the value of current supplied to the ultrasonic oscillator 110. Particularly, as shown in FIG. 21A, it is desirable to make linear the relation between the fuel quantity to be injected and the desired amplitude of the vibration element 107 in view of the processing ability and the spray characteristic. Accordingly, the control is performed such that the watt value, that is the current value, is changed with respect to the fuel quantity. Further, as shown in FIG. 22, it will do, alternatively, to perform the control such that the frequency is caused to be the resonance frequency $w_c$ at the maximum fuel quantity, without achieving the watt control.

Further, it will do of course to maintain constant the frequency and/or amplitude independently of the fuel quantity.

Figure 23:
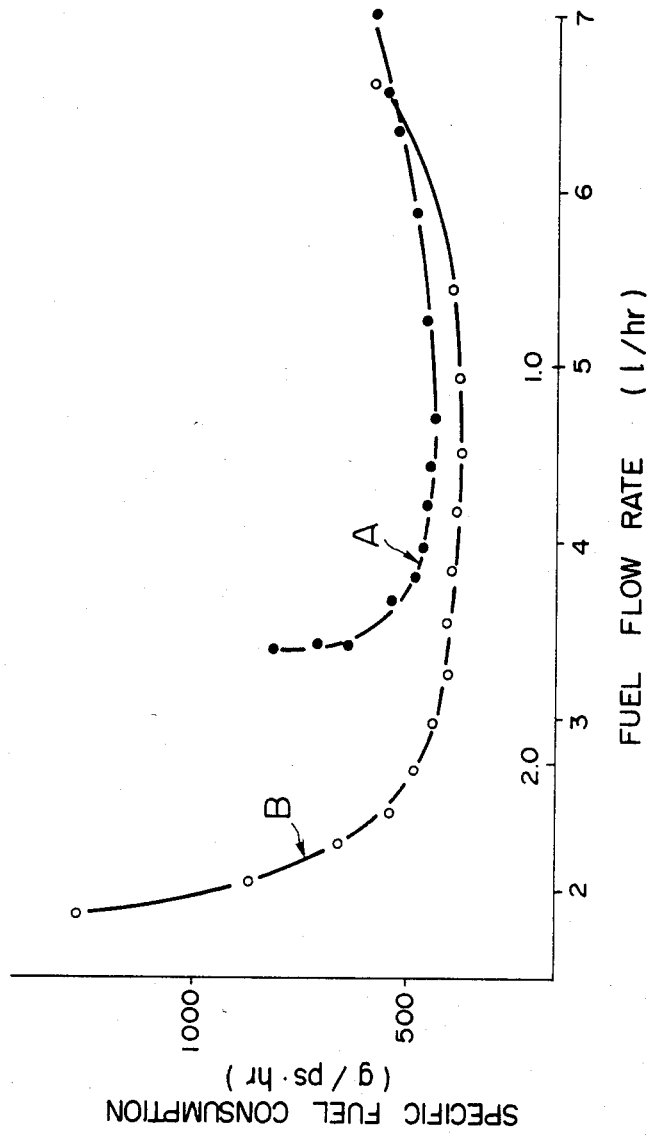
FIG. 23 is a graph showing the experimental result of specific fuel consumption in the embodiment of FIG. 17.

FIG. 23 shows the result of experiment in which specific fuel consumption was obtained by using the cylinder fuel supply system arranged in the manner as described above. In the experiment, 100% methanol was used as fuel. In the drawing the curve A shows the characteristic obtained in the experiment in which fuel was injected and ignited in the latter period of compression stroke by using high pressure type injector, while the curve B illustrates the characteristic of specific fuel consumption obtained in the system of the present embodiment. As is apparent from FIG. 23, lean combustion as well as reduction of specific fuel consumption can be remarkably attained owing to the atomization by the ultrasonic vibration element 107 and the control of spray characteristic.

Figure 24:
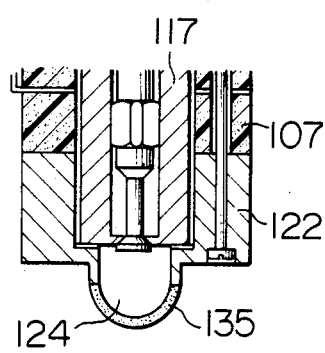
FIGS. 24 and 25 are cross-sections of modifications of the fuel holding portion of the injection valve shown in FIG. 18.
Figure 25:
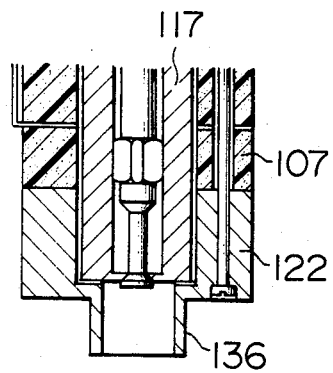

Next, modifications of the fuel holding portion of the injector according to the embodiment will be described. FIG. 24 shows one of the modifications in which the mask formed, as the fuel holding portion, on the lower pressing member 122 is constituted by a dome 135 made of a porous material without forming the injection holes 125. In this embodiment, the injected fuel is held in the cavity 124 and the pores of the porous dome 135 and thereafter the thus held fuel is atomized and scattered in the combustion chamber 103 by means of vibration by the ultrasonic vibration element 107. FIG. 25 shows another modification in which the fuel holding portion is constituted by a cylinder 136. In this modification, the injected fuel strikes against the inner wall of the cylinder 136 and the reflected fuel strikes against the inner wall again, so that the fuel may be held in the cylinder 136 for the period of repetition of this striking/reflecting operation. After this period has elapsed, the fuel is atomized and scattered from the forward end of the cylinder 136 into the combustion chamber 103.

Figure 26:
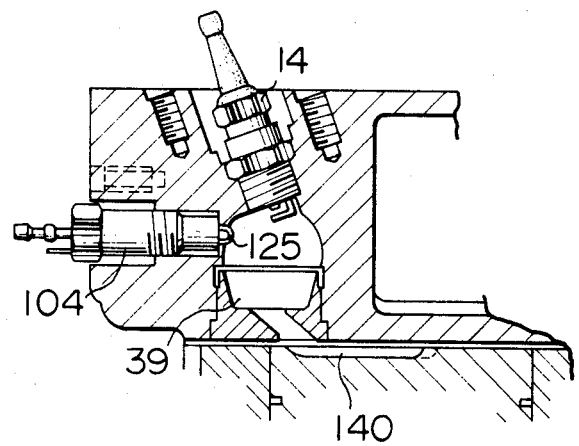
FIG. 26 is a cross-section illustrating a further embodiment of the present invention.

FIG. 26 illustrates a further embodiment of the present invention, in which the system is applied to an engine provided with an auxiliary combustion chamber 139 with the above-mentioned fuel injector 104 and ignition plug 14 attached in the auxiliary combustion chamber 139. In this case, the injection hole 125 of the mask 108 is directed toward a main combustion chamber 140. In this embodiment, when air flows into the auxiliary combustion chamber 139 in the compression stroke, the injected fuel spray is conveyed by this air flow toward the ignition plug 14 and ignited thereat.

As described above, the embodiment is advantageous in that it is made possible to reduce the pressure in the fuel supply system and to atomize fuel by means of ultrasonic vibration element to control the spray characteristic, and therefore it is made possible to easily attain a complete electronic control of fuel quantity, to reduce the specific fuel consumption by 10~15%, and to attain stratified charge with lean fuel.

We claim:

1. An electronically-controlled cylinder fuel supply system for an engine comprising:
   a plurality of combustion chambers each of which is provided with a fuel injector and an ignition plug;
   a suction air path for supplying air into each of said combustion chambers;
   an exhaust path for discharging an exhaust gas from each of said combustion chambers;
   sensor means for sensing an operating condition of said engine;
   first means for determining the amount of fuel to be injected and the time of ignition for discharge of said ignition plug for each combustion chamber on the basis of sensed signals from said sensor means;
   means for causing said fuel injector of each combustion chamber to inject said amount of fuel determined by said first means directly into the associated combustion chamber within the period of time from initiation of the intake stroke of the combustion chamber to the time of said ignition as determined by said first means for the respective combustion chamber; and
   second means for determining an air quantity to be drawn into said suction air path on the basis of said sensed signals from said sensor means;
   wherein said injector comprises a fuel holding portion provided at a fuel injection end of said injector for temporarily holding injected fuel therein and a vibration means for vibrating said fuel holding portion such that the fuel held in said fuel holding portion is atomized and scattered in said combustion chamber in the atomized state.

2. An electronically-controlled cylinder fuel supply system for an engine having a plurality of combustion chambers comprising:
   a respective fuel injector being provided for each of said plurality of combustion chambers for injecting fuel directly therein and an ignition plug being provided at each combustion chamber for igniting the fuel supplied by said injector;
   a suction air path for supplying air into each of said combustion chambers;
   an exhaust path for discharging an exhaust gas from each of said combustion chambers;
   means for detecting the speed of revolution of said engine;
   means for sensing an operating condition of said engine; and means for determining the valve open duration for the injector and the ignition timing of the ignition plug for each combustion chamber on the basis of sensed signals from said sensing means and the speed of revolution detected by said speed revolution detecting means;

each said injector including fuel scattering means for scattering the fuel injected during said valve open duration, into said combustion chamber, with a predetermined delay time from the time of initiation of the fuel injection, in which said fuel scattering means includes a cylindrical member provided at a fuel injection end of the injector.

3. An electronically-controlled cylinder fuel supply system for an engine having a plurality of combustion chambers comprising:

a respective fuel injector being provided for each of said plurality of combustion chambers for injecting fuel directly therein and an ignition plug being provided at each combustion chamber for igniting the fuel supplied by said injector;

a suction air path for supplying air into each of said combustion chambers;

an exhaust path for discharging an exhaust gas from each of said combustion chambers;

means for detecting the speed of revolution of said engine;

means for sensing an operating condition of said engine; and means for determining the valve open duration for the injector and the ignition timing of the ignition plug for each combustion chamber on the basis of sensed signals from said sensing means and the speed of revolution detected by said speed revolution detecting means;

each said injector including fuel scattering means for scattering the fuel injected during said valve open duration, into said combustion chamber, with a predetermined delay time from the time of initiation of the fuel injection, in which said fuel injector includes a poppet valve as its injection valve.

4. An electronically-controlled cylinder fuel supply system for an engine having a plurality of combustion chambers comprising:

a respective fuel injector being provided for each of said plurality of combustion chambers for injecting fuel directly therein and an ignition plug being provided at each combustion chamber for igniting the fuel supplied by said injector;

a suction air path for supplying air into each of said combustion chambers;

an exhaust path for discharging an exhaust gas from each of said combustion chambers;

means for detecting the speed of revolution of said engine;

means for sensing an operating condition of said engine; and means for determining the valve open duration for the injector and the ignition timing of the ignition plug for each combustion chamber on the basis of sensed signals from said sensing means and the speed of revolution detected by said speed revolution detecting means;

each of said injector including fuel scattering means for scattering the fuel injected during said valve open duration into said combustion chamber, and means for delaying operation of said fuel scattering means until a predetermined delay time has elapsed from the time of initiation of the fuel injection.

5. An electronically-controlled cylinder fuel supply system according to claim 4, in which said fuel scattering means includes a fuel holding portion provided at a forward end of said injector for temporarily holding fuel therein and a vibration means for vibrating said fuel holding portion.

6. An electronically-controlled cylinder fuel supply system according to claim 5, in which said injector injects fuel before the pressure in said combustion chamber exceeds a predetermined value in each compression stroke and said fuel holding portion is vibrated before said ignition timing is reached.

7. An electronically-controlled cylinder fuel supply system according to claim 6, in which said vibration means causes said fuel holding portion to begin vibration after the pressure in said combustion chamber exceeds a predetermined value.

8. An electronically-controlled cylinder fuel supply system according to claim 7, in which said vibration means causes said fuel holding portion to end its vibration immediately before ignition of the spark plug.

9. An electronically-controlled cylinder fuel supply system according to claim 5, in which said fuel holding portion is in the form of a dome having an injection hole formed in opposition to said ignition plug.

10. An electronically-controlled cylinder fuel supply system according to claim 5, in which said holding portion is the form of dome made of a porous material.

11. An electronically-controlled cylinder fuel supply system according to claim 5, in which said vibration means includes a vibration element and an oscillator for supplying electric power to said vibration element to cause it to vibrate.

12. An electronically-controlled cylinder fuel supply system according to claim 11, in which said vibration element is an ultrasonic vibration element.

13. An electronically-controlled cylinder fuel supply system according to claim 11, in which said oscillator produces and applies to said vibration element, an output signal having a frequency which is equal to a natural frequency of said vibration element.

14. An electronically-controlled cylinder fuel supply system according to claim 11, in which said oscillator changes the amplitude of vibration of said vibration element depending on the valve open duration indicated by said determining means.

15. An electronically-controlled cylinder fuel supply system according to claim 11 in which said oscillator changes the frequency of vibration of said vibration element depending on the valve open duration indicated by said determining means.

16. An electronically-controlled cylinder fuel supply system for an engine comprising:

a plurality of combustion chambers each of which is provided with a fuel injector and an ignition plug;

a suction air path for supplying air into each of said combustion chambers;

an exhaust path for discharging an exhaust gas from each of said combustion chambers;

sensor means for sensing an operating condition of said engine;

first means for determining the amount of fuel to be injected and the time of ignition for discharge of said ignition plug for each combustion chamber on the basis of sensed signals from said sensor means including means for determining a valve open duration and a fuel injection ignition timing for each injector such that the valve open duration of the injector is terminated before the time of ignition for the spark plug provided at the corresponding combustion chamber;

means for causing said fuel injector of each combustion chamber to inject said amount of fuel determined by said first means directly into the associated combustion chamber within the period of time from initiation of the intake stroke of the combustion chamber to the time of said ignition as determined by said first means for the respective combustion chamber, each injector including fuel scattering means for scattering the fuel injected during said valve open duration; and second means for determining an air quantity to be drawn into said suction air path on the basis of said sensed signals from said sensor means.

17. An electronically-controlled cylinder fuel supply system according to claim 16, further including means for detecting the revolution speed of the engine, and wherein said first means includes a memory storing a map of valve open duration values and means for retrieving from said memory valve open duration values on the basis of the sensed signals from said sensor means and the speed of revolution detected by said revolution speed detecting means.

18. An electronically-controlled cylinder fuel supply system according to claim 16, in which an ignition signal detecting means is provided in a line for supplying an ignition signal to said ignition plug for each of said respective combustion chambers so as to detect the supplied ignition signal to thereby successively set the fuel injection individually for each of said chambers on the basis of an output signal of said ignition signal detecting means of each of said combustion chambers.

19. An electronically-controlled cylinder fuel supply system according to claim 16, in which said injector comprises a fuel holding portion for previously holding therein said amount of fuel determined by said first means and means for injecting said amount of fuel held in said fuel holding portion into said combustion chamber.

20. An electronically-controlled cylinder fuel supply system according to claim 17, in which the injection initiation timing is determined by retrieving timing values from said map stored in said memory on the basis of the valve open duration values determined from said map and said speed of revolution detected by said revolution speed detecting means.

21. An electronically-controlled cylinder fuel supply system according to claim 1, in which said injector injects fuel into said fuel holding portion before the pressure in said combustion chamber exceeds a predetermined value in each compression stroke and causes said vibration means to vibrate said fuel holding portion to thereby scatter the atomized fuel into said combustion chamber before said ignition timing is reached.

* * * * *